E. KATZINGER.
CAKE OR DOUGH FILLING DEVICE.
APPLICATION FILED JUNE 27, 1910.
1,146,576.
Patented July 13, 1915.
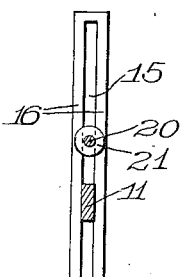
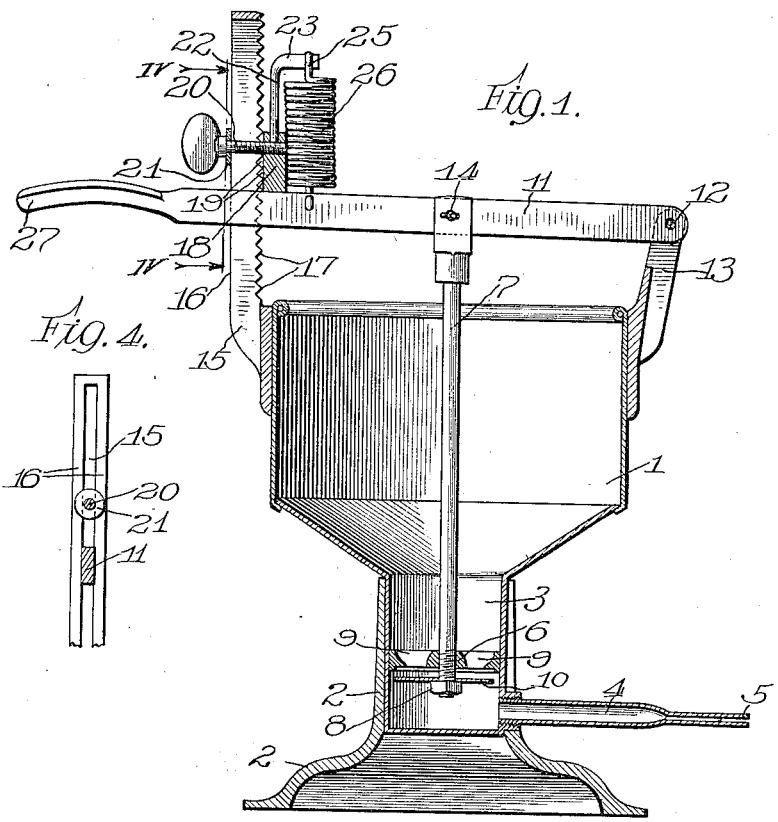
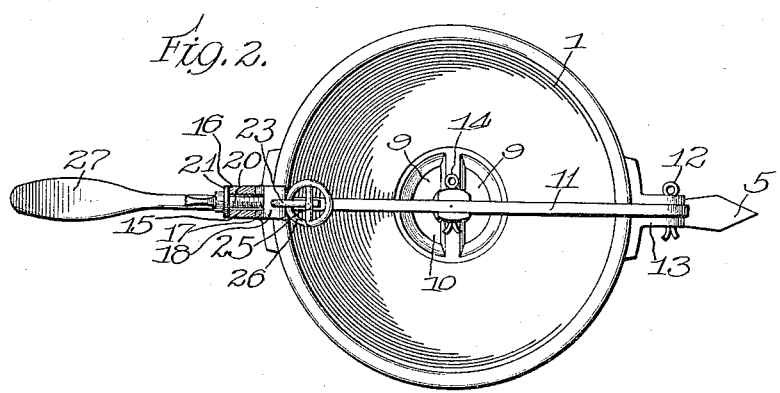
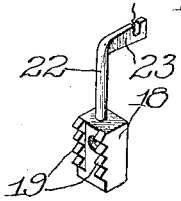
Witnesses:
Inventor:
Edward Katzinger

UNITED STATES PATENT OFFICE.

EDWARD KATZINGER, OF CHICAGO, ILLINOIS, ASSIGNOR TO EDWARD KATZINGER COMPANY, OF CHICAGO, ILLINOIS, A CORPORATION OF ILLINOIS.

CAKE OR DOUGH FILLING DEVICE.

1,146,576. Specification of Letters Patent. Patented July 13, 1915.

Application filed June 27, 1910. Serial No. 569,051.

*To all whom it may concern:*

Be it known that I, EDWARD KATZINGER, a citizen of the United States, residing at Chicago, in the county of Cook and State of Illinois, have invented certain new and useful Improvements in Cake or Dough Filling Devices, of which the following is a specification.

This invention relates to cake or dough fillers and has for its primary object to provide an improved construction, combination and arrangement of the parts of the feed regulating mechanism of a device of this character.

More specifically, one of the objects is to provide improved means for regulating the quantity fed at each movement of a feed operating lever.

Other and further objects will appear in the specification and be more specifically pointed out in the appended claims, reference being had to the accompanying drawings exemplifying the invention, and in which—

Figure 1 is a medial section of a machine provided with my improvements, parts being shown in elevation. Fig. 2 is a top plan view of the same, parts being shown in section. Fig. 3 is a detail perspective view of the stop, to be referred to hereinafter. Fig. 4 is a section on the line IV—IV of Fig. 1.

Referring more specifically to the drawings and to the embodiment of the invention shown therein, a hopper 1 which is adapted to receive the material for filling cakes, éclairs, etc., is provided with a standard or base member 2 within which is housed a cylindrical portion 3 of the hopper 1. The cylinder 3 is provided below with a discharge outlet 4 having a flattened nozzle 5 adapted to be inserted into the dough or cake to be filled. Reciprocable within the cylinder 3 is a piston or plunger 6 rigidly mounted on the lower end of a piston rod 7. Said piston rod 7 extends beyond the plunger 6 and is provided with a nut 8 on the threaded extremity of said rod, said nut being riveted thereon. The piston or plunger 6 is provided with passages or ports 9 through which the filler from the upper portion of the receptacle 1 passes when said ports 9 are not closed. Reciprocably mounted on the lower end of the rod 7 between the piston 6 and the nut 8 is a metallic disk 10 which is normally in the position shown in Fig. 1 but when the piston is forced downwardly against the filler in the lower portion of the cylinder 3, is forced against the piston 6 and closes the ports 9 therein. The filler is thus discharged from the nozzle 5.

In order to provide means for regulating the quantity discharged at each stroke of the rod 7, an operating lever 11 is pivotally mounted at 12 in a projection 13 rigidly mounted on the hopper or receptacle 1. Said lever 11 is pivotally connected at 14 with the upper end of the rod 7. The swinging end of the lever 11 is slidably mounted in a slot 15 extending longitudinally throughout approximately the entire length of a standard or support 16 rigidly mounted on the receptacle 1. Said standard 16 is provided on one face with serrations 17 on both sides of the slot 15. Reciprocable along the standard 16 is a stop block 18 which is provided with serrations 19 adapted to engage the serrations 17 on the standard 16.

In order to provide means for clamping the stop block 18 to the standard 16, a clamping screw 20, preferably in the form of a thumb screw as shown is threaded to the block 18 and extends through the slot 15, being provided on the outside of the standard 16 with a shoulder 21.

It will thus be seen that the block 18 may be shifted to any point on the standard 16 to permit the lever 11 to be raised any desired height to correspond with the amount of filler to be fed from the receptacle 1. The slotted standard 16 is closed at the top to retain the clamping screw 20 and stop block 18 from being displaced. Projecting upwardly from the stop 18 is a spring supporting standard 22 provided with an overhanging arm 23 with a notch 24 adjacent the outer end thereof. Engaging in said notch 24 is a loop 25 of a helical spring 26, the lower end of said spring being connected to the lever 11 and adapted to hold said lever against the stop block 18. The lever 11 is provided without the standard 16 with a handle 27.

What I claim is—

1. A cake and dough filler, comprising a hopper; a plunger in the hopper; a vertical guide on one edge of the hopper; a lever pivoted at one of its ends to one edge of the hopper, extending across the latter and slidably mounted in the guide;

a rod connecting said plunger and said lever; a block adjustably secured to said guide and adapted to limit the movement of the lever in one direction; an arm on said block extending above the lever; and a spring connected to the arm and lever adapted to yieldably hold the latter against the block.

2. A cake and dough filler, comprising a hopper; a plunger in the hopper; a standard on the hopper having a vertical slot therein; a lever pivoted to the hopper, extending across the latter and disposed in said slot; a rod connecting said plunger with said lever; a block on one edge of said standard and providing a stop limiting the movement of the lever in one direction; a screw passing through said slot and adjustably securing the block to the standard; an arm on said block; and a tension spring connecting the free end of the arm with the lever and adapted to normally maintain the latter against the block.

In testimony whereof I have signed my name to this specification in the presence of two subscribing witnesses, on this 23d day of June A. D. 1910.

EDWARD KATZINGER.

Witnesses:
A. O. KNIGHT,
M. W. CANTWELL.

Copies of this patent may be obtained for five cents each, by addressing the "Commissioner of Patents, Washington, D. C."